(No Model.) 2 Sheets—Sheet 1.

R. BING.
SCALPER.

No. 342,857. Patented June 1, 1886.

WITNESSES: INVENTOR
J. E. Shaw Robert Bing (No Model.)  2 Sheets—Sheet 2.

R. BING.
SCALPER.

No. 342,857. Patented June 1, 1886.

WITNESSES:

INVENTOR
Robert Bing

UNITED STATES PATENT OFFICE.

ROBERT BING, OF MAY'S LANDING, NEW JERSEY.

SCALPER.

SPECIFICATION forming part of Letters Patent No. 342,857, dated June 1, 1886.

Application filed November 12, 1885. Serial No. 182,524. (No model.)

*To all whom it may concern:*

Be it known that I, ROBERT BING, a citizen of the United States, residing at May's Landing, in Atlantic county, New Jersey, have invented a new and useful improvement in scalpers or machines for separating the coarse bran and other coarser portions of the ground or crushed wheat from the flour and middlings, of which invention the following is a specification.

This invention relates to a machine for scalping crushed or ground wheat and for cleaning wheat grains or berries preparatory to their reduction to flour; and it consists in the features hereinafter described, and pointed out in the claims.

Figure 2:
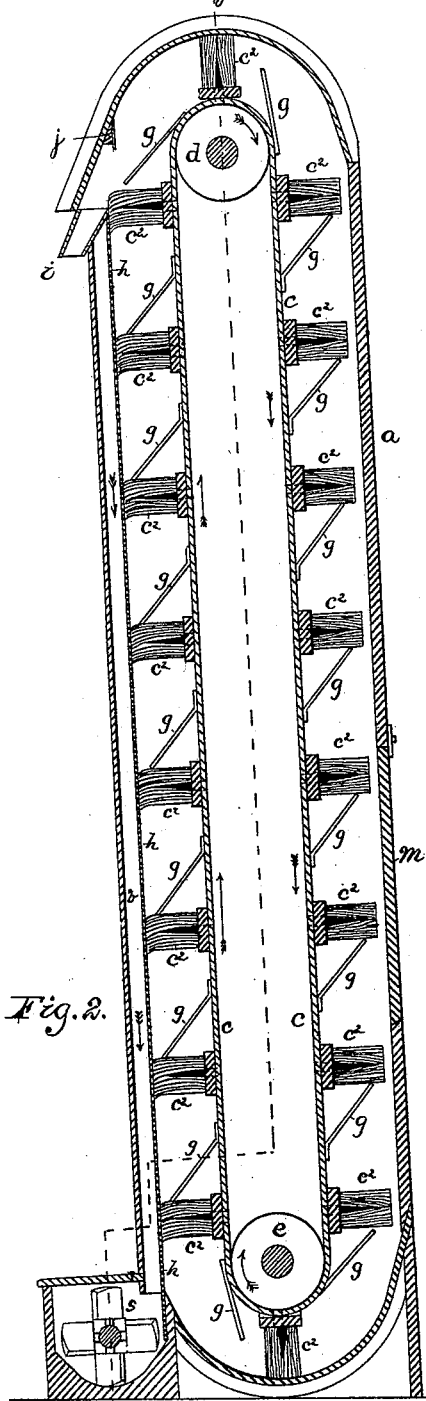
Figure 1:
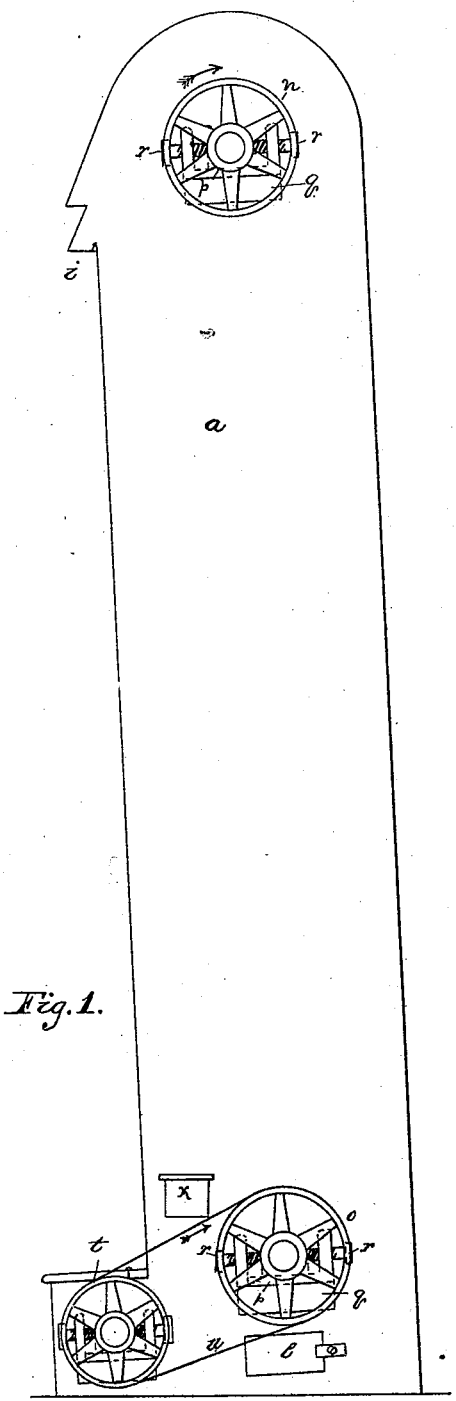
Figure 4:
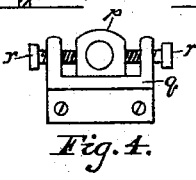
Figure 3:
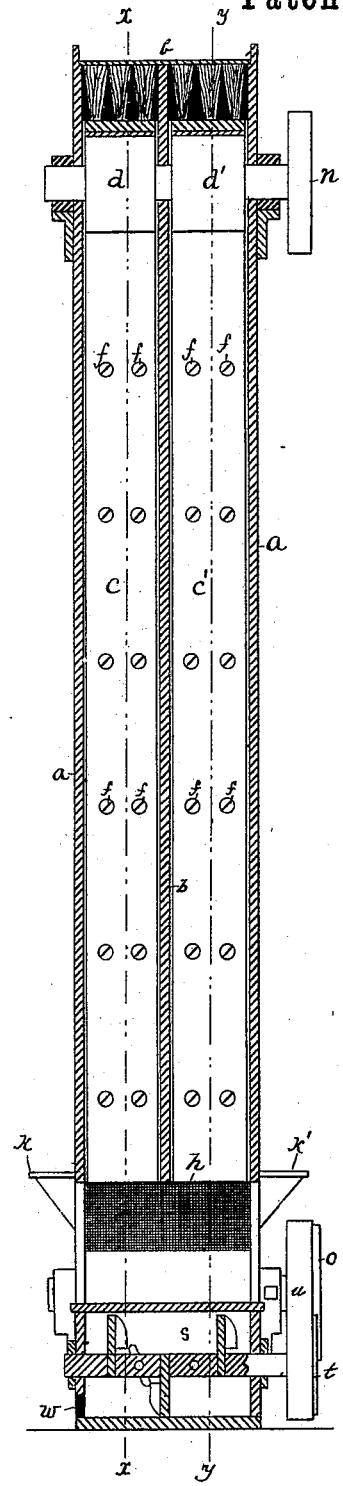

In the annexed drawings, which represent a double machine, Figure 1 is an elevation of one side of the machine, showing the exterior driving pulleys, the journals of the belt-pulley shafts, the bearings, and adjustable pillow-blocks of these journals, a feed-spout, and a discharge-spout, the opposite side being of a similar character, omitting the pulleys. Fig. 2 is a vertical section of the same on either of the lines $x\ x$ or $y\ y$ of Fig. 3. Fig. 3 is a vertical section of the same on the line $z\ z$ of Fig. 2. Fig. 4 is a front elevation of one of the several similar bearings and pillow-blocks of the brush-belt pulley-shafts.

$a$ represents the outside case, which is divided into two compartments by a partition, $b$.

$c$ and $c'$ are two endless belts, which pass around pulleys $d$ and $d'$, Fig. 3, at top and around similar pulleys at the bottom, one of these bottom pulleys (marked $e$) being shown in Fig. 2.

$c^2$, Fig. 2, are brushes attached by screws, bolts, or other sufficient fastenings, $f$, Fig. 3, to the respective belts.

$g$ are return chutes or shields, each consisting, preferably, of a piece of stiff belt-leather corresponding in width with the width of the respective belts and brushes, and attached at one side or end by rivets, screws, or other sufficient fastenings to the belts $c$ and $c'$, respectively. The opposite or free sides or ends of guards $g$ bear against the bristles of the brushes, as shown in Fig. 2.

$h$, Figs. 2 and 3, represents wire-cloth, constituting a sieve, which corresponds in width with the width of the belts, and extends up the front from the bottom of the machine to the level of the discharge-spouts near the top, one of these spouts (marked $i$) being shown in Fig. 2. Another discharge-spout, (not shown,) similar to spout $i$, is similarly situated with respect to belt $c'$. The brushes $c^2$ are arranged in relation to the wire-cloth $h$, so that the bristles drag a little against the wire-cloth, as shown in Fig. 2.

Fig. 2 is a projection attached to the casing. It corresponds in width with the breadth of the brushes on belt $c$, and operates to clean the materials from the brushes as they pass it in rotation. A similar device for cleaning the brushes of each elevator-belt employed is similarly attached to the casing near the top of each compartment.

$k$ and $k'$, Fig. 3, are spouts or pockets, by which the ground or crushed wheat is fed into the machine.

$l$, Fig. 1, and $m$, Fig. 2, are doors to afford access to the belts and brushes.

$n$ and $o$ are driving-pulleys on the shafts of the belt-pulleys $d$ and $e$. The pillow-blocks $p$, Fig. 4, of these shafts are made adjustable in the bearings $q$ by means of screws $r$, in order that the brushes may be set nearer to the wire-cloth as their bristles wear down.

$s$, Fig. 3, represents a conveyer, which I prefer to construct as described in Letters Patent No. 307,904, granted to me November 11, 1884.

$t$ is a driving-pulley on the conveyer-shaft, and $u$ is a belt. (See Fig. 1.)

Motion is communicated to the machine through the pulley $n$.

The ground or crushed wheat is passed into the machine through the spouts $k$ and $k'$, and is elevated by the brushes $c^2$, which press the fine materials through the meshes of the wire-cloth $h$. These materials drop down the space or conduit $v$ into the conveyer, escaping thence through an aperture in the bottom or end of the conveyer, as at $w$, Fig. 3. The return chutes or shields $g$ oblige the materials to fall toward the wire-cloth, so that these materials are drawn in by the brushes, and the separation of the fine from the coarser materials is thus insured, the coarser materials being carried on up by the brushes and dropping into the discharge-spouts $i$. Any material adhering to the brushes is knocked off by the cleaner $j$, the face of which is in a plane a little nearer the center of the pulley $d$ than the plane of the wire-cloth, as indicated in Fig. 2.

The brush-belts are represented as being arranged vertically; but they will work well when arranged at any elevation from an angle of forty-five degress to a vertical position.

The drawings represent a casing containing two elevators separated by a partition, the feed-spouts being in the sides. As it is preferable that these spouts should be so located, a single casing should not include more than two elevators. It is to be understood, however, that a single elevator can be used, and that two, three, four, or any greater number of elevators may be used in conjunction. If three are used, two of them being constructed as shown, the third may be completely independent of them, and if four are used two of them in one casing may be completely independent of the other two in another casing. They may be so arranged that a single driving-shaft may extend through all of them or each pair of elevators, or each single elevator may have a separate driving-shaft. When more than two elevators are used, they are so arranged as to afford access to the feed-spouts on the sides, a space of four inches between the separate casings being sufficient for this purpose. When all the elevators used are arranged in line, a single conveyer serves them all, or a separate conveyer for each elevator may be employed.

The return chutes or shields can be dispensed with if the brushes are arranged at an inclination in relation to the sieve corresponding with the inclination of said chutes; but such construction would be much less efficient and more expensive.

The cleaning-bar $j$ can be dispensed with, but it is better to use it.

It is to be understood that the coarser materials elevated by belt $c$ and discharged at spout $i$ pass thence through the reducing-rolls again, preparatory to their being fed into the elevator $c'$. When introduced into this second elevator, they are treated precisely as described in regard to elevator $c$, and these operations are repeated successively with each of the several elevators used.

I claim—

1. An elevator-scalper consisting of the following elements in combination, viz: an inclosing-casing, $a$, a sieve, $h$, an endless elevator-belt, $c$, brushes $c^2$, mounted on said belt and moving in dragging contact with said sieve, the return chutes or shields $g$, mounted on said belt in advance of said brushes, the drums or pulleys supporting and actuating said endless belt, and adjustable bearings for said pulleys, which permit the adjustment of said brushes against said sieve and the cleaning-bar $j$, substantially as set forth.

2. The combination of casing $a$, sieve $h$, elevator-belt $c$, brushes $c^2$, mounted on said belt and moving in dragging contact with the sieve, the return chutes or shields $g$, mounted on the belt in advance of the brushes, the drums or pulleys supporting and actuating the said endless belt, and adjustable bearings for the pulleys, which permit the adjustment of the brushes against the sieve, in the manner and for the purpose substantially as set forth.

3. The combination of casing $a$, sieve $h$, elevator-belt $c$, brushes $c^2$, mounted on said belt at an inclination and moving in dragging contact with the said sieve, drums or pulleys supporting and actuating said belt, and adjustable bearings for said pulleys, which permit the adjustment of the brushes against the said sieve and the cleaning-bar $j$, in the manner and for the purpose substantially as set forth.

ROBERT BING.

Witnesses:
J. E. SHAW,
P. A. FENIMORE.